United States Patent [19]
Schell

[11] 3,838,623
[45] Oct. 1, 1974

[54] REPRODUCING APPARATUS

[76] Inventor: Friedrich P. Schell, 4313 San Bernardino Ave., Las Vegas, Nev. 89102

[22] Filed: May 15, 1972

[21] Appl. No.: 253,334

[52] U.S. Cl............ 90/13.7, 144/145 R, 144/145 A
[51] Int. Cl............................ B23c 1/18, B27c 5/00
[58] Field of Search........ 90/13.7, 13.4; 144/145 A, 144/145 R, 134, 154

[56] References Cited
UNITED STATES PATENTS
2,143,258   1/1939   Bickel.................................. 90/13.7
3,224,340  12/1965   Wahlstrom........................... 90/13.7

*Primary Examiner*—Gil Weidenfeld
*Attorney, Agent, or Firm*—Jerry R. Seiler

[57] ABSTRACT

A machine having first and second carriages mounted for horizontal reciprocation on opposite end portions of a track, with a rotary support on each carriage and an adjustable lever between them for moving the second carriage back and forth in response to reciprocation of the first carriage and in a ratio determined by the adjustment of the lever. A motor rotates the support on the first carriage while correspondingly, and reversibly, rotating the second. The first carriage is spring-urged toward a follower so that the combined rotary and reciprocating motion will move a pattern on the support to cause the follower to traverse the periphery of the pattern, and corresponding relative motion is produced at the other support between a workpiece and a shaping tool. The tools are adjustable relative to the axes of rotation, and a modified embodiment mounts the follower and the tool for either identical or generally proportional vertical movement for three-dimensional reproduction.

26 Claims, 12 Drawing Figures

REPRODUCING APPARATUS

BACKGROUND OF THE INVENTION

This invention relates generally to an apparatus for producing a shape or pattern on a workpiece, and relates more particularly to an apparatus in which this is accomplished by moving a pick-up tool along a given path, and transmitting this movement to a work station where a shaping tool is moved along a corresponding path relative to a workpiece.

Typically, the pick-up tool is a follower that is appropriately shaped to pass smoothly around a pattern or template, and the shaping tool is a rotary cutter or the like. The present invention is particularly well suited for use in woodworking, for example in the production of specially contoured furniture pieces and cabinetry, but is equally well adapted for use in other duplicating operations, as will be apparent from the following to those skilled in this art.

In addition to the exact reproduction of the shape and size of a pattern, it often is desirable to reproduce a shape in varying sizes, or to invert or reverse a shape to produce it in both "right-hand" and "left-hand" forms in which one form is a mirror image of the other. Moreover, the decorative design of articles, such as cabinet doors sometimes calls for the repetition of a contour in steps of successively changing size on the surface of a workpiece, each one within the next larger and following the same path, or on workpieces to be mounted in overlying relation.

In the past, these special duplicating operations customarily have been accomplished by time-consuming, expensive and often inexact hand labor, or by repetitive machining operations using different patterns, inverted patterns and the like. No machine has been available that has sufficient versatility to accomplish all of the foregoing operations on a practical, satisfactory and economical basis.

The closest such machine that has been found is shown in U.S. Pat. No. 2,718,702, which discloses a mechanism having pivotally mounted supports for a pattern and a workpiece, engageable respectively by a tracing tool and a cutting tool, the supports being linked, geared or otherwise connected for simultaneous and corresponding angular motion, and also being carried on a common platform piece, called a "ratio member." This member is, itself, pivotally supported on the base of the mechanism. Thus, the supports are pivotable about their own individual axes, and also pivot with the ratio member about a common axis.

This patent discloses an interesting concept that is similar to some of the aspects of the present invention, and the mechanism disclosed in the patent apparently is capable of accomplishing a variety of different operations with respect to ratio variations, changes in proportions, and production of inverted, or mirror-image shapes. The use of this type of mechanism, however, is limited and complicated by the fact that it combines pivotal motion of the two supports with additional pivotal movement of the ratio member upon which they are mounted. This evidently was the result of a belief that reproduction of irregular shapes in different sizes and in inverted relation required such double pivotal motion, and the complicated manipulations resulting from this motion.

SUMMARY OF THE INVENTION

The present invention resides in a relatively simple and highly versatile machine of the foregoing general character which is capable of reproducing the shape of a pattern identically on a workpiece, or in different selected sizes, or as a mirror image of the same or different sizes, and which is relatively easy to operate on a production basis, while avoiding the need for the double pivotal motion of the machine in the aforesaid patent. Moreover, three-dimensional reproduction, with the same variations, may be included by adding a relatively simple accessory control to the machine.

More specifically, and as illustrated in the presently preferred embodiments shown herein for purposes of illustration, the invention resides in a reproducing machine which has two supports that are rotatably mounted on reciprocating carriage means, and are coupled together both for corresponding rotary movement and for corresponding reciprocation. It has been found that the corresponding reciprocation, when combined with corresponding rotary motion, produces corresponding motion of the supports, including the motion necessary to move a follower and a shaping tool completely around a pattern and a workpiece with the supports rotating in the same direction, or in opposite directions. Reversal of the direction of relative rotation of the driven support produces an inverted shape, and variations in the ratio of transmission of the reciprocating motion vary the proportions of the pattern and the finished workpiece, while incremental variations in the spacing of the follower and the shaping tool from the centers of rotation of the pattern and work supports vary the size of the shape as it is reproduced, in selected increments.

The invention may take a variety of forms, some of which are shown herein to illustrate the principles of the invention. In the presently preferred basic form, two supports are rotatably mounted on two separately movable carriage sections supported for corresponding reciprocation on the opposite end portions of an elongated track, and are connected by a motion-reversing coupling which is driven by reciprocating input motion imparted to one of the supports, and produces corresponding reciprocating output motion of the other support, for identical reproduction of the motion or reproduction in a different size that may be selected by varying the motion-reversing coupling. Rotary input motion imparted to one support is reproduced identically at the other support, either in a forward direction to produce a "right-hand" unit, or in a reverse direction to produce a "left-hand" unit.

Although the follower and the shaping tool may be mounted on the supports to obtain the desired motion relative to a stationary pattern and workpiece, the preferred embodiments have the tool mounted stationarily and the pattern and the workpiece disposed on the reciprocating rotary supports. More specifically, the tools are mounted on a crossbar overlying and paralleling the track, and the carriage sections are supported for reciprocation on the track beneath the tools, which are arranged for engagement with opposite sides of the pattern and work supports. The motion-reversing coupling is a lever which is supported between the two carriage sections by a vertical pivot and is longitudinally adjustable relative to the pivot to change the effective lengths of the opposite end portions of the lever. Such adjustment selectively changes the size of the finished workpiece relative to the pattern, generally in selected scales determined by the ratio of the lengths of the end portions of the lever on opposite sides of the pivot.

For repetition of a pattern in contours of successively changing sizes, at least one tool is on a tool mount that is adjustable along the crossbar toward and away from the center of rotation of the associated rotary support. In this instance, the mount for the shaping tool is adjustable for this purpose, and the mount for the follower also is adjustable, primarily to facilitate start-up with different patterns that may be of widely varying sizes.

One support is urged toward its associated tool, to hold the part thereon in constant engagement with the tool, and the other support preferably is similarly urged toward its associated tool to avoid inaccuracy due to looseness in the motion-reversing coupling. A motor is provided to rotate the pattern support, and preferably is coupled to both supports through a gear box and two spline shafts, the gear box being shiftable to change one shaft from forward to reverse rotation, and back, thereby to provide the capacity for "right-hand" and "left-hand" reproduction.

Three-dimensional reproduction is accomplished with the basic machine by supporting the tool mounts for selective adjustment toward and away from the rotary supports, vertically in the preferred orientation of the machine, and connecting the tool mounts by a coupling which is adjustable for a ratio of one-to-one, or for a reduced or enlarged size. The preferred coupling operates in a manner similar to the motion-reversing lever between the carriage sections, having a slidable pivot for changing the effective lengths of the lever arms.

Other advantages and aspects of the invention will become apparent from the following detailed description, taken in conjunction with the accompanying drawings.

DETAILED DESCRIPTION (FIGS. 1 THROUGH 8)

As shown in the drawings for purposes of illustration, the invention is embodied in an improved machine 10 for reproducing the shape of a pattern 11 on a workpiece 12 by moving the pattern relative to a follower 13 in a manner which causes the latter to pass completely around the pattern in continuous engagement with a contoured side edge 14 thereof, and transmitting this motion to the workpiece so as to move the workpiece in a corresponding manner relative to a shaping tool 15. Thus, the shaping tool reproduces the contour of the pattern on the workpiece in moving relative the latter along a path corresponding to the path of the follower relative to the pattern. The shapes shown in the drawings for the pattern and the workpiece are illustrative only, and are not intended to represent any particular commercial operation.

Figure 1:
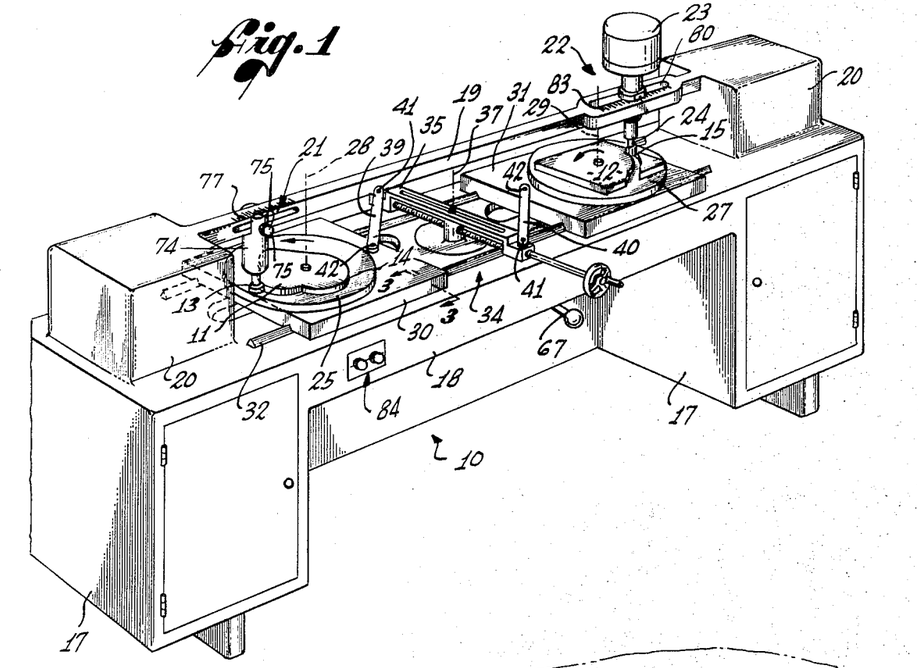
FIG. 1 is a perspective view of a machine embodying the novel features of the present invention.

In general, the illustrative machine 10 comprises a base in the form of a table having two upright pedestals 17 and an elongated top 18 supported on the pedestals, horizontally in the preferred orientation of the machine, and a superstructure on top of the table in the form of a horizontal crossbar 19 extending longitudinally of the table and supported at each end by an upright post 20. Mounted on the crossbar 19 in longitudinally spaced relation are a follower assembly 21 supporting the follower 13 below the crossbar for engagement with the pattern 11, and a shaping tool assembly 22 supporting the tool 15, herein a rotary cutter, below the crossbar for engagement with the workpiece 12, the cutter being the same size as the follower and driven by a suitable motor 23 which herein is mounted above the crossbar and carries the cutter on the lower end of the depending shaft 24 of the motor.

The pattern 11 and the workpiece 12 are fastened to two supports 25 and 27 which are spaced apart on the table and are mounted both for rotation about vertical axes 28 and 29 and for reciprocation longitudinally of the crossbar. For these purposes, each support 25, 27 preferably is in the form of a disc and is supported at its center on an upright pin defining the axis 28, 29, and the pins are carried by two horizontal carriage platforms 30 and 31 mounted on top of the table for back and forth sliding along preselected paths. These paths herein are determined by a track formed by two parallel sideways 32 extending longitudinally of the table, the platforms being mounted on opposite ends of the track.

Figures 2, 3:
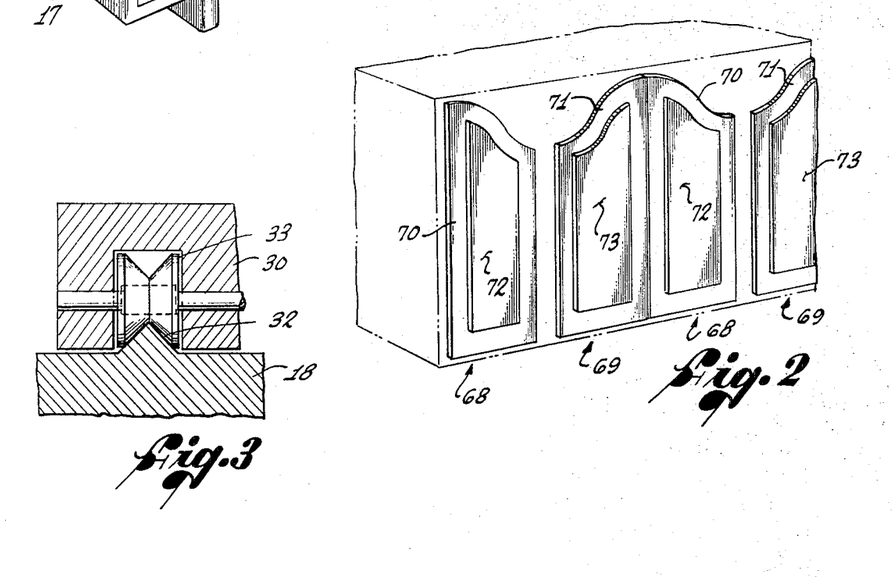
FIG. 2 is a fragmentary perspective view on an enlarged scale of cabinet doors illustrating shapes that may be produced with the machine of FIG. 1.
FIG. 3 is a greatly enlarged fragmentary cross-sectional view taken along line 3—3 of FIG. 1.

As shown in FIGS. 1 and 3, each slideway may be a ridge of inverted V-shaped cross-section, and each platform may be equipped with set of four rollers 33 with grooved peripheries matingly engaging the slideways. The platform 30 supporting the pattern 11 is on the left end portion of the track, generally beneath the follower assembly 21, with follower 13 positioned to engage the pattern on the left side of the axis 28. The platform 31 supporting the workpiece 12 is on the right end portion of the track, generally beneath the shaping tool assembly 22, with the cutter 15 positioned to engage the workpiece on the right side of the axis 29.

Mounted on the table between the two platforms 30 and 31 is a motion-reversing coupling 34 including a lever 35 which is pivoted between its ends for rocking in a horizontal plane about an axis 37 defined by a vertical pin 38 (see FIG. 6) projecting upwardly from the table 18. One end portion of the lever is connected by a link 39 to the pattern-supporting platform 30, and the other end portion is connected by a similar link 40 to the work-supporting platform 31. Pivot pins 41 connect the links to the lever adjacent the free ends thereof, and similar pins 42 connect the links to the platforms, preferably at the centers of the adjacent sides of the platforms.

Figure 4:
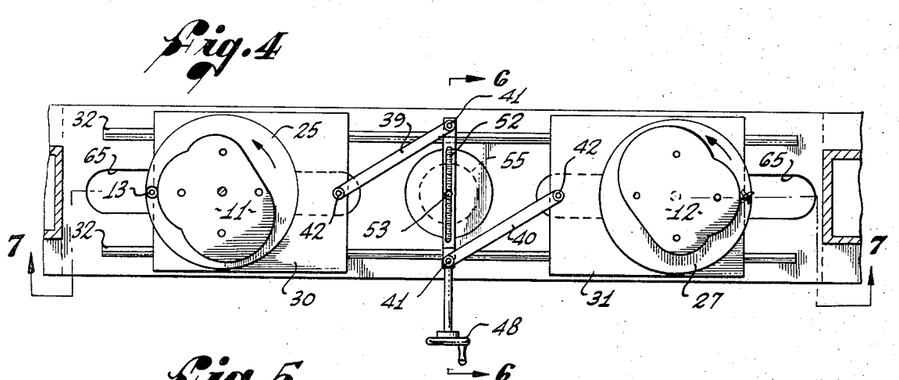
FIG. 4 is a fragmentary cross-sectional view taken in a horizontal plane in FIG. 1.
Figure 5:
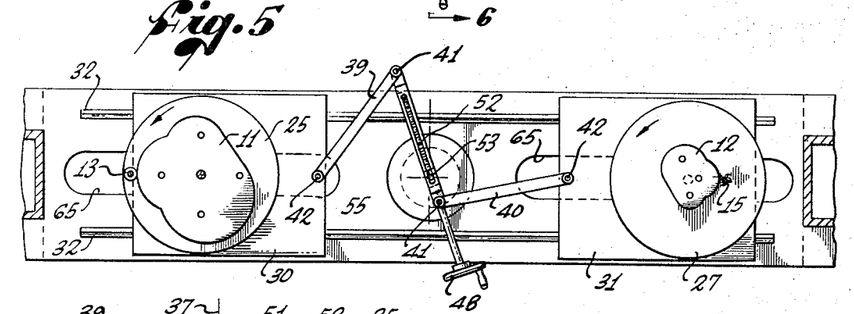
FIG. 5 is a view similar to FIG. 4 with parts in moved positions.

With the foregoing arrangement, rocking of the lever 35 in one direction about its pivotal axis 37 counterclockwise as viewed in FIGS. 4 and 5, results in movement of the platforms away from each other, and rocking of the lever in the opposite direction results in movement of the platforms toward each other. Although the motion is reversed, corresponding reciprocation of the two platforms is produced by the lever.

For selective variation of the ratio of movement of the two platforms 30 and 31, the lever 35 is supported for selective longitudinal adjustment relative to its pivotal axis 37. For this purpose, and as shown most clearly in FIG. 6, the lever comprises a central bracket or yoke that is carried on an elongated adjusting screw 43 which extends through an internally threaded sleeve 44 fixed in a block 45 on the pivot pin 38. On opposite sides of the block, the adjusting screw extends through two bushings 47 that are supported in the opposite ends of the yoke, in coaxial relation with the threaded sleeve 44, and on one side of the screw is a handwheel 48 for rotating the screw about its longitudinal axis.

Shoulders 49 on the screw prevent axial movement of the screw in the bushings, and a pin 51 projects upwardly from the pivot block 45 through a longitudinal slot 52 in the raised portion of the yoke and has a pointer 53 (see FIG. 8) on its upper end for moving along a scale on top of the yoke and indicating the position of the yoke relative to the pivot pin 38. The pins 41 connecting the links 39 and 40 to the lever 35 are screws carried adjacent the ends of the yoke as shown most clearly in FIGS. 6 and 8.

Figures 6, 7, 8:
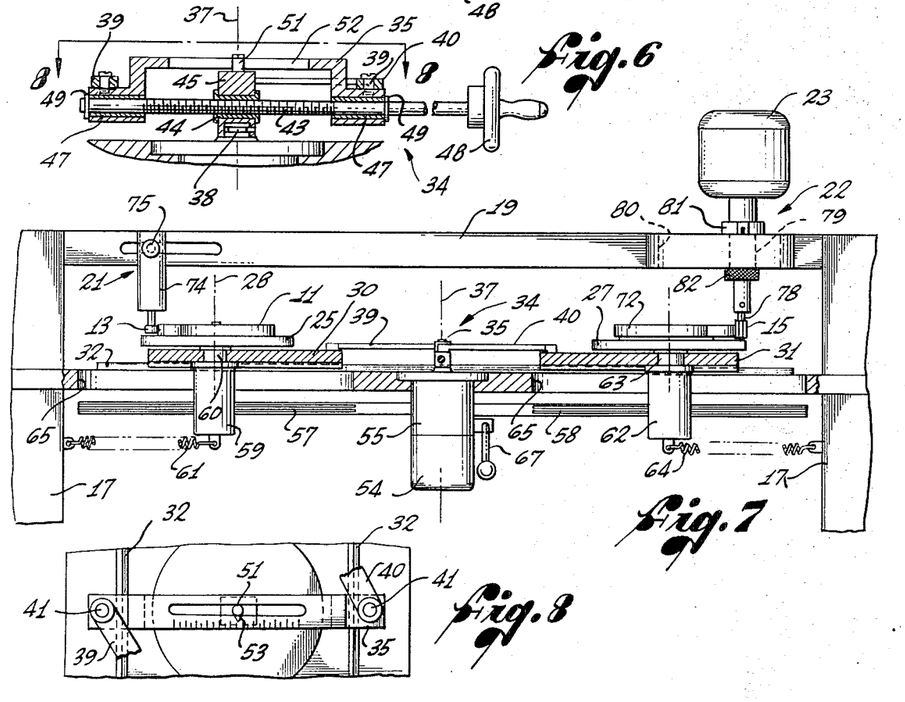
FIG. 6 is an enlarged fragmentary cross-section taken substantially along line 6—6 of FIG. 4.
FIG. 7 is a fragmentary cross-section taken along line 7—7 of FIG. 4.
FIG. 8 is a fragmentary plan view taken from the direction of line 8—8 of FIG. 6.

Thus, as the handwheel 48 is turned in one direction, the adjusting screw 43 is fed through the threaded sleeve 44 to increase the effective length of the end portion of the lever connected to the pattern platform 30 while reducing the length of the end portion connected to the work platform 31, and reversal of the rotation of the handwheel has the opposite effect. The pointer 53 and the scale provide a continuing indication of the ratio of the lengths of the effective lever arms, and thus of the ratios of reciprocating movement that will be produced by the lever.

As shown most clearly in FIG. 7, simultaneous rotation of the pattern and work supports 25 and 27 is accomplished by means of a rotary motor 54 that is slung below the central portion of the table top 18. This motor is coupled through appropriate reduction gearing in a gear box 55 to two spline shafts 57 and 58 extending in opposite directions from the gear box. One spline shaft 57 extends to the left beneath the table top 18 and through a gear box 59 suspended from the underside of the pattern platform 25. Inside the gear box 59, the shaft 57 is spline-coupled to gearing for rotating an upright output shaft 60 according to the rotation of the spline shaft 57, and this output shaft is coaxially connected to the pattern support 25 to rotate the latter at a relatively slow rate appropriate for the reproducing operation to be performed. A spring 61 is stretched between the gear box 59 and the left pedestal 17 to hold the pattern against the follower 13 as the support is rotated.

The other spline shaft 58 extends to the right beneath the table top 18 and through a gear box 62 suspended from the underside of the work support 27. The shaft is spline-coupled to gearing inside the gear box 62 for rotating an upright output shaft 63 according to the rotation of the shaft 58, and this output shaft is coaxially connected to the work support 27 to rotate the latter at the same rate of rotation imparted to the pattern support. A second spring 64 preferably is stretched between this gear box 62 and the right pedestal 17 to urge the work support away from the pattern support.

Both gear boxes 59 and 62 extend through elongated slots 65 in the table top 18, so as to be freely movable back and forth with the work and pattern supports under which they are carried. Of course, the spline couplings between the shafts 57 and 58 and the gears boxes 59 and 62 permit the gear boxes to move along the shafts. Thus, the motor 54 can rotate the supports continuously at a selected rate as the platforms reciprocate on the track.

When the supports are rotated in the same direction, the pattern is reproduced with the same "hand," of the same or a different size, depending upon the lever ratio. The pattern is turned 180°, however, in relation to the workpiece to compensate for the motion-reversing function of the lever, and the placement of the follower and the cutter on opposite sides of the two supports.

When an inverted, mirror-image reproduction is desired, the direction of rotation of the work support 27 is reversed relative to the pattern support 25. This is accomplished in the illustrative machine simply by reversing the rotation of the spline shaft 58, for example, with reversible gearing in the central gear box 55 controlled by a hand lever 67 mounted on the gear box. Details of the gearing are not shown because gearing having these capabilities is well known to those skilled in the art.

As shown in FIGS. 1 and 7, the two assemblies 21 and 22 are supported on the crossbar 19 for selective adjustment, longitudinally thereof, into different positions relative to the axes of the associated supports 25 and 27. This facilitates the initial set-up of the machine for different jobs to be performed, and also makes it possible to set the tool support for the production of a given pattern contour in different incremental sizes, simply by changing the spacing of the cutter 15 from the axis 29 while maintaining the same spacing of the follower 13 from the axis 28. The cabinet door assemblies 68 and 69 shown in FIG. 2 illustrate one type of product that may be produced in this manner, each having a contoured door 70 or 71, and an overlay 72 or 73 of the same shape but of reduced size. Moreover, the doors 70 are "left-hand" relative to the doors 71, and the same is true of the overlays 72 relative to the overlays 73.

For purposes of illustration, the follower assembly 21 is shown as including a cylindrical mount 74 having a notch in its upper end that forms two legs which slidably straddle the crossbar 19, and a set screw 75 threaded into one side for locking the mount 74 in a selected position along the crossbar. A scale 77 (FIG. 1) on top of the crossbar cooperates with a mark on the end of the mount 74 to indicate the position of the assembly along the crossbar.

The shaft 78 of the motor 23 for driving the cutter 15 extends downwardly through a tool mount in the form of a sleeve 79 which is slidably mounted in a vertically opening slot 80 formed in the crossbar, the sleeve having annular collars 81 and 82 above and below the crossbar for holding the assembly in place in the slot. The lower collar 82 is knurled to facilitate gripping, and is threaded onto the sleeve to permit loosening preparatory to sliding of the assembly along the crossbar, and subsequent tightening to lock the assembly in any selected position along the slot. A second scale 83 (FIG. 1) on the crossbar cooperates with a mark on the upper collar to indicate the position of the assembly along the crossbar.

The scales 77 and 83 are spaced the same distances from the central axis 37 and are calibrated to indicate when the follower 13 and the cutter 15 are the same distance from the center. If a shape is to be produced in successively smaller sizes that are to be fitted one within another, the cutter can be adjusted successively inwardly, to the left in FIGS. 1 and 7, after each successive part, has been made in increments of desired sizes as indicated on the scale 83.

Assuming that the shape of a pattern is to be reproduced identically (that is, the same size and "hand"), the tool mounts 74 and 79 are set in positions identically spaced from the axes 28 and 29, the lever 35 is set for one-to-one reproduction with the opposite end portions of equal effective length, and the gear shift lever 67 is set for "forward" rotation of the work support 27, that is, in the same direction as the pattern support 25. With the pattern and a workpiece clamped in corresponding positions on the two supports, and with the follower engaging one side of the pattern and the cutter engaging the opposite side of the workpiece, the cutter motor 23 may be started to begin rotating the cutter, and the motor 54 may be started to begin rotating the two supports. Suitable controls are provided in a readily accessible place, such as on the front of the table top as indicated at 84 in FIG. 1.

From this point, the cycle of the machine is automatic, because the follower 13 is held in engagement with the rotating pattern 11, which thus reciprocates above the track in accordance with radial variations in its contour. Such reciprocation is transmitted directly to the pattern platform 30 through the mounting which holds the shaft 60 in the platform, and thus reciprocates the platform on the track.

At the same time, the coupling 34 transmits the reciprocation, in reverse, to the work platform 31, which is moved correspondingly back and forth along the track and carries the work support 27 with it. Since the work support is rotated at the same rate and in the same direction as the pattern support, the relative motion between the work and the cutter is the same as that between the pattern and the follower, and the shape of the pattern is identically reproduced on the workpiece.

If a "mirror image" part is to be produced, for example, a left door which cannot be made as a right door and simply turned over, all that is necessary is the reversal of the rotating drive and the repetition of the operation with the same pattern. The entire operation remains the same, except that the relative rotary motion between the cutter and the workpiece is reversed. Radial displacements of the two tools from the axes of rotation of the pattern support and the work support are the same throughout the cycle.

If a similar contour but a smaller size is desired, for example, for the overlays 72, 73 that are to be applied as ornamentation to specially shaped doors 70, 71, as shown in FIG. 2, all that is necessary to adjust the machine for the production of the overlays, after production of the doors from an appropriately shaped pattern (not shown), is the setting of the cutter mount to the left along the crossbar by the desired increment. Of course, the doors may be produced in "right-hand" and "left-hand" versions of the same size, and "right-hand" and "left-hand" overlays may be made, all from the same pattern.

If generally proportional, rather than merely incremental, size changes are desired, this is accomplished by adjusting the effective lengths of the opposite end portions of the motion-reversing lever 35. For example, if a three-to-two reduction is desired, the lever is set so that a linear motion of three inches at the left pivot 42 will produce two inches of linear motion at the right pivot 42. Thus, radial displacement of the follower 13 from the axis 28 will result in a corresponding, but reduced, displacement of the cutter 15 from the axis 29, the accuracy of the reduction depending upon the accuracy of the coupling between the two platforms.

For one-to-one reproduction, the lever 35 has a high degree of accuracy. For ratios other than one-to-one, the accuracy is reasonably good, but there are slight variations as the angle of the lever changes. If high precision is required in ratios other than one-to-one, a coupling other than the lever may be used, one example being a common control proportionally driving two separate linear drive motors for the two platforms. This approach has the additional advantages of permitting remote location of the machining operation for safety reasons, and also makes it possible to operate a plurality of machining operations from a single input station. Of course, the corresponding (and reversible) rotary drive can be accomplished in a similar manner.

Figure 9:
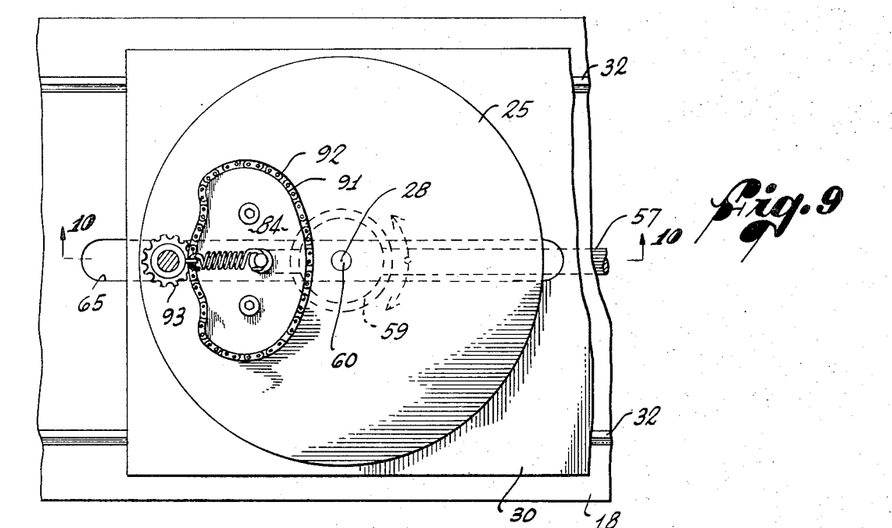
FIG. 9 is an enlarged fragmentary plan view partly in cross-section corresponding to part of FIG. 4 but showing an alternative arrangement of a pattern and rotary driving means for the pattern support.
Figure 10:
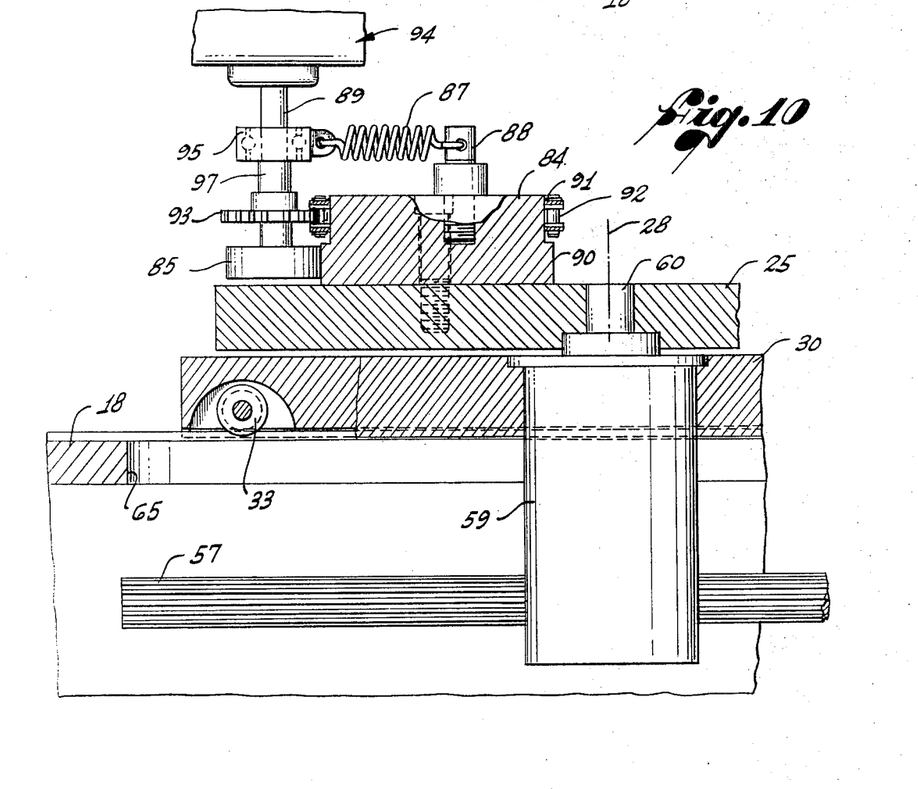
FIG. 10 is an enlarged fragmentary cross-section taken substantially along line 10—10 of FIG. 9.

DETAILED DESCRIPTION, MODIFIED EMBODIMENT (FIGS. 9 AND 10)

It is not essential for all uses of the reproducing machine to have the pattern and the workpiece on-center on their respective supports, nor is it necessary for the supports to make full 360 degree revolutions during machining of an endless contour. If a pattern is mounted off-center and urged continuously toward the follower, regardless of its orientation relative to the follower, the full periphery of the pattern can be duplicated with a combination of reciprocating motion of the platforms and angular motion of the supports, and either "right-hand" or "left-hand" parts can be made by controlling the direction of relative rotation.

Such a modification is shown in FIGS. 9 and 10, wherein the basic elements of the machine are similar to the basic elements in FIGS. 1 through 8 and are indicated by the same reference numbers. A relatively small pattern 84, however, is mounted on the rotary support 25, entirely on one side of the axis 28, and is urged toward a follower 85 by a spring 87 which is stretched between an anchor pin 88 embedded in the top of the pattern and a shaft 89 which supports the follower.

In this case, the pattern 84 has a contoured lower peripheral surface 90 that is engaged by the follower, and also has a stepped-down upper surface 91 about which a drive chain 92 is tightly wrapped. A coaxial sprocket 93 on the shaft 89 above the follower meshes with the chain, and the shaft is rotated by a drive motor and reduction gearing, in a case indicated generally by the number 94. The spring 87 is attached to a collar 95 having a slip fit with the shaft and held above the sprocket by a spacer sleeve 97.

Thus, as the shaft 89 turns in one direction, the follower rolls on the surface 90 and the pattern 84 is rocked above the axis 28 of the support 25 while the platform 30 reciprocates on its track, and these motions combine to permit the pattern to travel around the follower as the lattern transverses the periphery of the pattern. As before, the rotary and reciprocating motions are transmitted to the work support through a suitable coupling, for example, using the gear box 59 to drive the spline shafts, in order to produce the same relative motions between the shaping tool and a workpiece mounted on the corresponding portion of the work support. Motion reversal in the gearing drives the work support to produce a mirror image.

Figure 11:
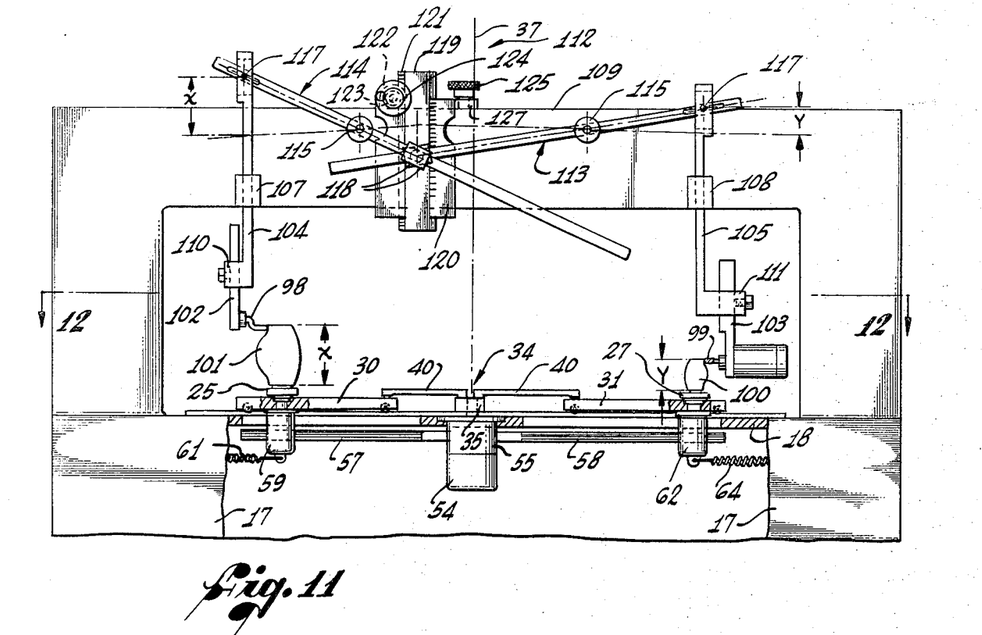
FIG. 11 is a fragmentary side elevational view of a modified form of the invention for three-dimensional reproduction.
Figure 12:
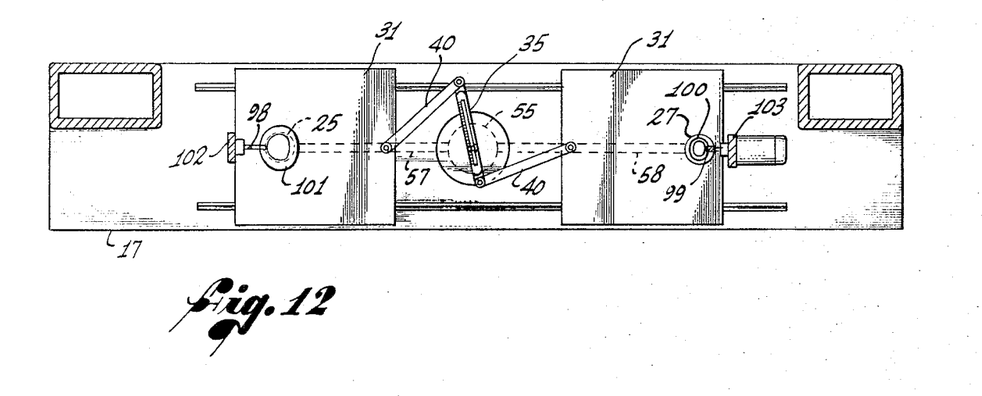
FIG. 12 is a cross-sectional view taken along line 12—12 of FIG. 11.

DETAILED DESCRIPTION, SECOND MODIFIED EMBODIMENT (FIGS. 11 AND 12)

Another variation that is possible with the basic machine elements is a three-dimensional reproducing machine, as shown in FIGS. 11 and 12. In this machine, most of the basic elements that correspond to elements of the first embodiment also are indicated by the same reference numbers, the changes and additions being in the manner of supporting and moving a follower 98 and a cutting tool 99 to perform successive shaping operations on side-by-side, vertically spaced bands of a workpiece 100 as the follower travels around corresponding bands of a three-dimensional pattern 101.

The reproducing operation performed on each band is essentially the same as the machining operation performed in a single cycle with the machine of FIGS. 1 through 8, but the follower 98 and the tool 99 are supported for selective movement toward and away from the work supports 25 and 27, both on a one-to-one basis and in other ratios corresponding to the two-dimensional ratios obtainable by adjusting the effective lengths of the opposite end portions of the lever 35. Thus, the three-dimensional object 100 can be produced in the same scale as the pattern 101, or in a larger or smaller size, with third-dimensional variations corresponding to or independent of the two-dimensional variations obtained with adjustments of the lever 35.

As shown most clearly in FIG. 11, the follower 98 and the cutter 99 are carried on tool mounts 102 and 103 that are supported on the lower ends of two elongated arms 104 and 105 which are guided for vertical sliding in sleeves 107 and 108 on one side of a horizontal crossbar 109. Each tool mount is vertically adjustable in a bracket 110, 111 which projects laterally from the lower end of the associated arm 104, 105 to facilitate initial set up, and the vertical position of each arm 104, 105 is determined by a tool-raising mechanism indicated generally at 112.

The tool raising mechanism 112 may take various forms, including individual motors proportionally driven through a common control, but herein is shown as a linkage arrangement comprising two elongated levers 113, 114 each having a fixed central pivot 115 on the crossbar 109, and a sliding pivotal connection 117 at one end with the upper end of an arm 104, 105. Between the two pivots 115, the levers 113, 114 extend through two sleeves 118 which are mounted to pivot about a common horizontal axis perpendicular to the crossbar 109 and centrally located thereon.

The pivot for the sleeves is carried by a vertical rack 119 that is dovetailed into a collar 120 for up and down endwise motion, and has teeth 121 along one side edge. These teeth mesh with a pinion 122 on one end of a shaft 123 that is journaled in the collar alongside the rack, and a handwheel 124 is mounted on the other end of the shaft for use in turning the pinion and thus raising or lowering the rack. A suitable lock (not shown) is provided to hold the rack at selected levels.

To permit variations in the ratio of up-and-down movement of the follower 98 and the cutter 99, the collar 120 is slidable horizontally along the crossbar to different selected positions, and is fastenable in each such position by a set screw 125 threaded through a tab 127 on the collar and adapted to be clamped against the crossbar.

With this arrangement, the position of the collar 120 along the crossbar 109 determines the ratio of the lengths of the inner or lower end portions of the levers 113 and 114 (that is, the portions between the pivots 115 and the sleeves 118), and this ratio determines the amount of upward motion imparted to the follower 98 and to the cutter 99 by a given increment of downward motion of the rack 119 relative to the crossbar 109. If the collar is centered, with the sleeves 118 on the center line 37 shown in FIG. 11, each such increment of the rack will raise the follower and the cutter equally. This is the setting used for one-to-one reproduction in the third dimension, which usually will be accompanied by one-to-one reproduction in the two-dimensional portion of the machine, as described in connection with FIGS. 1 through 8, the lever 35 being set with equal opposite end portions.

To produce a workpiece in three-dimensions, the follower 98 and the cutter 99 are set up to begin on corresponding portions of the pattern 101 and the workpiece 100 typically at the lower end, and a complete cycle is performed at this level to shape a single band around the base of the workpiece. Then the rack 119 is lowered one step, to raise the follower and the tool correspondingly, and the cycle is repeated, to machine the next band above the base of the workpiece. The steps of the rack are sized to blend each band with the previous one, and are determined by the type of tool used and the nature of the shape being reproduced.

When a size change is desired, the collar 120 is adjusted along the crossbar 109 to vary the ratio of the inner end portions of the two levers 113 and 114, and the lever 35 is adjusted correspondingly. Assuming that the workpiece is to be shaped to about one-half the size of the pattern, the levers are set for a two-to-one ratio of motion, both horizontally and vertically, and the process is repeated. Each downward step of the rack 119 produces an upward step of the follower that is about twice the length of the accompanying step of the cutter. The range of motion of the left pivot 117 and the follower 98 during the illustrative operation is indicated at $x$ in FIG. 11, while the corresponding, reduced range of motion of the right pivot 117 and the cutter 99 is indicated at $y$. The result is the production of a workpiece 100 that has the same shape as the pattern 101, but one half the size.

The other variations available with the form shown in FIGS. 1 through 8 also are available with the three-dimensional form, and are obtained in the same way. Although minor variations from precise scale may result from the use of the levers 113 and 114 in scales other than one-to-one, these variations are negligible from a practical standpoint. Moreover, if high precision is required, other proportional couplings may be used instead of the illustrative levers.

From the foregoing, it will be evident that the present invention provides a highly versatile machine which is capable of performing a wide variety of operations with minor and easily made adjustments in the machine. The rotary and reciprocating input motion at one support is transmitted to and reproduced at another support, which may be either on a common base with the first support or at a remote location, and the rotary motion may be reversed during transmission for a "mirror image" reproduction. Moreover, the reciprocating motion may be proportionally modified for a proportional reproduction, or the spacing of the follower and the shaping tool from their respective axes may be incrementally modified for incremental variations in contour. Of course, the follower and the cutting tool may be interchanged, from one state to the other without affecting the ability of the machine to perform its functions.

While the illustrative machine has been shown as having only one output station, it will be apparent that a plurality of output stations may be controlled and operated by a single input, simply by duplicating the illustrative output station and the couplings for transmitting the motions thereto. It also be apparent that, while specific embodiments have been shown and described, other modifications and changes may be made without departing from the spirit and scope of the invention.

I claim:

1. Apparatus for reproducing the shape of the peripheral surface of a pattern on a workpiece, said apparatus comprising:

a base having a top surface;
   a pair of spaced, parallel ways forming a track on said top surface;
   first and second independently movable carriage platforms disposed above said track and having means thereon engaging said track and mounting the platforms for back and forth reciprocation on opposite end portions of said track;
   a horizontal pattern support mounted on top of said first platform for rotation about a first vertical axis and for reciprocation with said first platform along the track;
   a horizontal work support mounted on top of said second platform for rotation about a second vertical axis and for reciprocation with said second platform along the track;
   means for rotating said pattern support about said first axis and correspondingly rotating said work support about said second axis, and for selectively reversing the direction of rotation of said work support;
   coupling means between said platforms for reciprocating said second platform in response to reciprocation of said first platform and in opposite directions, comprising a lever, a vertical pivot centrally supporting said lever on said base between said platforms for swinging in a horizontal plane, and a pair of links pivotally connected between said platforms and the opposite ends of said lever to transmit the motions of said opposite ends to the respective platforms;
   a superstructure above said platforms supported on said base in overlying relation therewith;
   a first tool mount on said superstructure depending therefrom toward said pattern support and having means thereon for engaging the peripheral surface of the pattern on a side thereof facing longitudinally of said track;
   a second tool mount on said superstructure depending therefrom toward said work support and having a tool thereon for engaging and shaping the workpiece on a side thereof facing in the opposite direction, longitudinally of said track;
   means urging said pattern support along said track toward said first tool mount;
   and means for adjusting said lever longitudinally relative to said pivot to vary the effective lengths of the opposite end portions of the lever, thereby varying the reproduction ratio.

2. Reproducing apparatus as defined in claim 1 wherein said rotating means comprise a rotary motor centrally mounted on said base, reduction gearing driven by said motor, a pair of spline shafts projecting in opposite directions from said reduction gearing longitudinally of said track and coupled to said supports to rotate them at the same rate, and a control for reversing the direction of said work support relative to said pattern support.

3. Reproducing apparatus as defined in claim 1 wherein said lever-adjusting means comprise a threaded connection pivotally supported on said base between said platforms, a screw threaded through said connection for longitudinal adjustment therein, said lever being carried by said screw for longitudinal adjustment therewith, and a handwheel mounted on said screw for rotating the same.

4. Reproducing apparatus as defined in claim 3 wherein said lever has a longitudinal scale thereon, and said connection has a pointer cooperating with said scale to indicate the position of said lever.

5. Reproducing apparatus as defined in claim 1 wherein at least one of said tool mounts is supported for selective adjustment longitudinally of said track.

6. Reproducing apparatus as defined in claim 1 wherein both of said tool mounts are supported for selective adjustment longitudinally of said track.

7. Reproducing apparatus as defined in claim 1 further including means supporting said tool mounts on said superstructure for selective vertical adjustment toward and away from said supports, for machining of successive vertically spaced bands around the workpiece as the follower is moved to successive vertically spaced bands around the pattern.

8. Reproducing apparatus as defined in claim 7 in which said supporting means for said tool mounts include mechanism for vertically moving said tool mounts in ratios other than one-to-one.

9. Reproducing apparatus as defined in claim 7 in which said means supporting said tool mounts comprise first and second levers each having a fixed pivot between its ends, an outer end pivotally connected to one of said tool mounts, and an inner end portion extending across the central portion of the apparatus, said inner end portions having sliding connections with a common pivot, and said common pivot being supported on said superstructure for adjustment longitudinally of said track to vary the ratio of the vertical motions of the mounts.

10. Reproducing apparatus as defined in claim 1 in which said urging means is a spring stretched between said base and said pattern support to urge the latter toward said first tool mount.

11. Reproducing apparatus as defined in claim 10 in which said first tool mount is a shaft having a follower positioned thereon for rolling engagement with the peripheral surface of the pattern, and in which the pattern has a second surface following said peripheral surface, said rotating means including a chain wrapped around said second surface, a sprocket on said shaft meshing with and driving said chain, and a motor for driving said shaft.

12. Reproducing apparatus as defined in claim 11 in which said pattern is mounted on said pattern support in off-center relation spaced from said first axis, and in which said urging means urge said pattern toward said shaft from all sides thereof.

13. Apparatus for reproducing the shape of a peripheral surface of a pattern on a workpiece, said apparatus comprising:
first and second carriage platforms supported for back and forth reciprocation along first and second linear paths;
means coupling said first and second carriage platforms and transmitting reciprocating motion of said first carriage platform to said second carriage platform and producing corresponding but reverse reciprocation of the latter;
a pattern support mounted on said first carriage platform for rotation about a first axis;
a work support mounted on said second carriage platform for rotation about a second axis;
means coupling said supports and transmitting rotation of said pattern support to said work support to produce corresponding rotation of said work support upon rotation of said pattern support;
and means for supporting a pattern-following tool in a first position along said first path for engagement with a longitudinally facing side of the peripheral surface of a pattern on said pattern support, and supporting a work-shaping tool in a second position along said second path for engagement with a longitudinally facing side of a workpiece on said work support, whereby both rotary and reciprocating motion imparted to said pattern support as the pattern is moved relative to and in engagement with the pattern-following tool are transmitted to said work support to move the workpiece thereon correspondingly relative to the work-shaping tool to reproduce the shape of the pattern on the workpiece.

14. Reproducing apparatus as defined in claim 13 in which said carriage platforms are independently movable along opposite end portions of a single track defining said paths, and said coupling means are responsive to reciprocating movements of said first carriage platform.

15. Reproducing apparatus as defined in claim 14 in which the coupling means include a lever having a central pivot and connected to said first carriage platform to be moved thereby, and also connected to said second carriage platform to move the latter.

16. Reproducing apparatus as defined in claim 15 in which the effective lengths of said lever on opposite sides of said pivot are selectively adjustable to vary the ratio at which reciprocating motion of said pattern support is transmitted to said work support.

17. Reproducing apparatus as defined in claim 16 in which said effective lengths are adjustable by means of a screw mechanism for shifting said lever longitudinally relative to said pivot.

18. Reproducing apparatus as defined in claim 17 in which said supports are coupled by a motor drivingly connected to said pattern support and operable to rotate the latter about said first axis, and also connected to said work support to rotate the latter about said second axis.

19. Reproducing apparatus as defined in claim 13 in which said means for supporting the tools comprise a superstructure overlying said paths in spaced relation with said supports, tool mounts extending toward said supports to hold the tools for engagement with the pattern and the workpiece, and means adjustably securing said tool mounts to said frame for selective variation of the relative spacing of each tool from the associated axis, thereby to vary the relative sizes of the template and the part to be shaped from the workpiece.

20. Reproducing apparatus as defined in claim 13 further including a superstructure overlying said paths in spaced relation with said supports, tool mounts extending toward said supports to hold the tools for engagement with the pattern and the workpiece, and means supporting said tool mounts on said superstructure for selective and corresponding movement toward and away from said supports, whereby the pattern-following tool is movable along a three-dimensional pattern in steps and the work-shaping tool is correspondingly movable along the workpiece to reproduce the shape thereof in three dimensions.

21. Reproducing apparatus as defined in claim 20 in which said tool mounts are supported for movement in ratios other than one-to-one.

22. Apparatus for reproducing the shape of the peripheral surface of a pattern on a workpiece, said apparatus comprising:
carriage means supported for back and forth reciprocation and having first and second carriage sections;
pattern and work supports respectively mounted on said first and second carriage sections for reciprocation therewith and also for rotation relative thereto about first and second spaced axes movable with the respective carriage sections;
coupling means for reciprocating said work support in a manner corresponding to but reverse to the reciprocation of said pattern support, and also for rotating said work support in a manner corresponding to rotation of said pattern support;
means for supporting a pattern-engaging tool in engagement with the peripheral surface of a pattern on said pattern support, and for also supporting a shaping tool for engagement with a workpiece on said work support, to reproduce the shape of the pattern on the workpiece by relatively moving the shaping tool and the work support along a path corresponding to the relative motion of the pattern-engaging tool and the pattern support, as the latter is relatively moved to shift the pattern-engaging tool around the pattern;

and means for selectively varying the extent of the relative motion transmitted by said coupling means in order to modify the workpiece produced in a manner corresponding to the variations in such relative motion.

23. Apparatus for reproducing motion at an output station in accordance with motion at an input station, said apparatus having:

a first carriage section mounted for back and forth reciprocation along a first path in an input station;

a first support mounted on said first carriage section for reciprocation therewith and also for rotation about a first axis on said first carriage section whereby said first support is movable by a combination of rotary and reciprocating motion to produce a selected input motion;

a second carriage section mounted for back and forth reciprocation along a second path in an output station;

a second support mounted on said second carriage section for reciprocation therewith and also for rotation about a second axis on said second carriage section;

means responsive to rotary and reciprocating motion in said input station for rotating said second support about said second axis in a manner corresponding to rotary motion of said first support and for reciprocating said second carriage section in a manner corresponding to but reverse to the reciprocating motion of said first carriage section, thereby to reproduce said input motion at said output station;

means for supporting and moving a pattern-engaging tool relative to a pattern at said input station and for supporting and moving a working tool relative to a workpiece at said output station corresponding to the relative movement of the pattern-engaging tool;

and means for selectively varying the response to at least one of said motions to vary the corresponding motion of said second support in a controlled manner.

24. Reproducing apparatus as defined in claim 23 in which the last-mentioned means varies the reciprocating motion substantially proportionally.

25. Reproducing apparatus as defined in claim 23 in which the last-mentioned means comprises means for selectively reversing the direction of rotation of said second support relative to said first support.

26. Reproducing apparatus as defined in claim 23 in which said means for moving the working tool corresponding to the pattern engaging tool varies the movement proportionally.

* * * * *